United States Patent [19]
Davis, Jr. et al.

[11] 4,249,952
[45] Feb. 10, 1981

[54] METHOD FOR PRODUCING CEMENT CLINKER FROM CEMENT KILN WASTE DUST

[75] Inventors: Howard F. Davis, Jr., Pittsburgh; John A. Persson, Gibsonia, both of Pa.

[73] Assignee: Pennsylvania Engineering Corporation, Pittsburgh, Pa.

[21] Appl. No.: 126,189

[22] Filed: Mar. 3, 1980

[51] Int. Cl.³ .................................................. C04B 7/36
[52] U.S. Cl. ..................................................... 106/103
[58] Field of Search ................................. 106/100, 103

[56] References Cited

U.S. PATENT DOCUMENTS

| | | | |
|---|---|---|---|
| 1,916,417 | 7/1933 | Coulson | 106/103 |
| 2,140,471 | 12/1938 | Frolich et al. | 106/103 |
| 4,001,030 | 1/1977 | Watson et al. | 106/103 |
| 4,173,487 | 11/1979 | Cohen | 106/103 |

*Primary Examiner*—James Poer

[57] ABSTRACT

A method is disclosed for obtaining useful products from cement kiln waste dust. The dust is collected and added to an electric arc furnace where it is melted. The temperatures required to melt the dust are sufficiently high that alkali sulfates present in the dust are volatilized, leaving a melt which has a composition acceptable for the production of cement clinker. The volatilized components are collected to form a second useful product; i.e., a potassium rich material suitable for the production of potassium bearing chemicals, such as fertilizers.

9 Claims, No Drawings

4,249,952

METHOD FOR PRODUCING CEMENT CLINKER FROM CEMENT KILN WASTE DUST

FIELD OF THE INVENTION

This invention relates generally to methods for preparing cements, and more particularly, to a method for preparing cement clinker and potassium rich by-products from cement kiln waste dust.

BACKGROUND OF THE INVENTION

Hydraulic cements are used in concrete and most masonry mortars. The principal ingredients of Portland cement, the best known hydraulic cement, are tricalcium silicate, dicalcium silicate, and calcium aluminum ferrite. These ingredients, when in a finely ground state and mixed with water, react to form a very hard material with an intermeshed crystalline structure.

The most common method of preparing Portland cement is by introducing finely ground lime and silica into a rotary kiln and heating the material to at least the point of incipient fusion (which is about 2325° F.) in the presence of alumina or iron oxide fluxes. The kiln itself is an elongated cylinder with its axis inclined slightly from the horizontal. The kiln is provided with a burner at its lower end. The dry ingredients are added to the upper end of the kiln and, owing to the slant of the kiln and the rotation of the kiln, the material gradually moves from a cool zone at the upper end to the fusion zone. In the hotter region of the kiln a reaction takes place to form new compounds which fuse and partially melt. This material when cooled becomes the well-known cement clinker. The clinker is then finely ground to create Portland cement.

Two of the major problems inherent in this process for preparing cement are the handling and disposing of the large quantity of dust generated in the process. The dust is caused by the powdery nature of the starting materials and the intermixing caused by the rotating kiln. Kiln dust, which can be as much as 40 to 50% of the starting ingredients, can be recycled to some extent, but total recycling is not possible because of an undesirable build-up in the alkali content of the dust. If the alkali content becomes too high, the final product will lose its cementitious properties. So in most plants where recycling is used, an alkali by-pass is required in the kiln off-take gas flues to bleed off a portion of the dust and alkalies and obtain control of the alkali content of the kiln feed. It will be appreciated then that alkali bearing kiln dust is a major environmental pollution problem for this industry. In addition, the dust loss problem is expensive because it decreases the production and material utilization efficiency of the plant.

OBJECTS OF THE INVENTION

It is a primary object of the present invention to provide a method for producing cement clinker from cement kiln waste dust.

Another object of the present invention is to provide a solution to the problem of handling and disposing of cement kiln waste dust.

Yet another object of the present invention is to provide a method for recovering useful products from cement kiln waste dust to improve cement making efficiency and to reduce waste product costs.

A further object of the present invention is to provide a method for recovery of high potassium products from cement kiln waste dust.

A still further object of the present invention is to provide a method for eliminating sulfur from the cement clinker derived from kiln waste dust if the concentration of this element is higher than desired.

How these and further objects of the invention are accomplished will be described in the following specification. Generally, however, the objects are accomplished by a method which comprises collecting cement kiln waste dust and introducing it into an electric arc furnace. The dust is melted, for example at a temperature of about 3200° F., at which temperature alkali sulfates are volatilized to leave a melt having an acceptable cement clinker composition. The volatilized material can be collected as a second useful product because it is high in potassium content. This latter material is suitable for use in fertilizers or as a raw material from which potassium may be extracted in purer forms. Another feature of the present invention is the discovery that sulfur may be eliminated from the cement clinker melt if the concentration of this element is higher than desired, and according to the present invention, excess sulfur is eliminated by adding alkali materials, such as $K_2CO_3$, $Na_2CO_3$, or $NAHCO_3$ to the dust. These materials combine with the sulfur at the high temperatures present in the furnace to produce volatile materials which are fumed from the furnace as the cement clinker is formed.

DESCRIPTION OF THE PREFERRED EMBODIMENT

In carrying out the process of the present invention, conventional rotary kiln and electric furnace devices may be employed. The kiln receives the powdered raw cement ingredients and, as mentioned previously, the dry ingredients are moved from the upper and cooler end of the kiln to the hotter end of the kiln due to the rotation of the kiln and the tumbling action caused thereby. An electrostatic precipitator of conventional design is provided for capturing the waste dust materials which escape from the kiln. The materials recovered by the precipitator are then passed to a storage hopper for use in the process of the present invention. The method of collecting the dust is not a part of the present invention and will vary widely depending on the design of the kiln. A typical dust generated by a Portland cement rotary kiln will have the following composition:

| Compound | | % in Kiln Dust |
|---|---|---|
| $SiO_2$ | | 15.7 |
| $Al_2O_3$ | | 4.4 |
| $Fe_2O_3$ | | 2.5 |
| CaO | | 49.2 |
| MgO | | 1.0 |
| $SO_3$ | | 5.4 |
| $Na_2O$ | | 0.2 |
| $K_2O$ | | 4.0 |
| L.O.I. | (Lost on ignition during analysis-includes water, $CO_2$, etc. | 17.6% |
| | | 100.0% |

The collected dust is added to an electric arc furnace which will typically include a metal shell, a refractory lining and a cover through which one or more electrodes are mounted. For purposes of the description of the preferred embodiment, the furnace may be a 150 kVA arc furnace.

After the dust is added to the furnace, the dust material is heated to form a melt. In practice, it has been found that the melt is formed at about 3200° F., a temperature which is about 400° F. higher than the maximum temperatures encountered in cement kilns. The temperature is conveniently measured by an immersion thermocouple. The 3200° F. temperature of the bath is high enough to volatize sulfates of sodium and potassium, which have boiling points of about 1850° F. and 3075° F. respectively. The melt produced by this method has an acceptable Portland cement composition, as illustrated by the following composition of the product:

| Compound | % in Clinker Product |
|---|---|
| $SiO_2$ | 20.90 |
| $Al_2O_3$ | 6.15 |
| $Fe_2O_3$ | 4.38 |
| CaO | 63.60 |
| MgO | 1.50 |
| $SO_3$ | 0.38 |
| $Na_2O$ | 0.08 |
| $K_2O$ | 0.43 |
| Misc. | 2.58 |
|  | 100.0% |

It can be noted from a comparison of the two tables presented to this point that the concentrations of MgO, $SO_3$, $Na_2O$, and $K_2O$ have been substantially reduced by the electric arc furnace treatment method. An important feature of the present invention though is the discovery that the components removed from the dust together constitute a second valuable product. For example, the composition of the recovered alkali products evolved from the initial melt process is as follows:

| Compound | % in Residue |
|---|---|
| $SiO_2$ | 1.1 |
| $Al_2O_3$ | 0.15 |
| $Fe_2O_3$ | 0.97 |
| CaO | 2.7 |
| MgO | 6.6 |
| $SO_3$ | 36.6 |
| $Na_2O$ | 2.4 |
| $K_2O$ | 40.5 |
| L.O.I. | 3.6 |
| Misc. | 3.5 |
|  | 98.1% |

This material is relatively high in potassium content with most of the potassium contained as potassium sulfate. It is suitable for use in fertilizers or as a raw material from which potassium may be extracted in a purer form. The method of the present invention then represents a new commercial source for potassium. The material fumed from the furnace during the cement clinker melting process may be collected in either an electrostatic precipitator or a baghouse.

Another feature of the present invention is the discovery of a unique method of eliminating sulfur from the cement clinker melt if the concentration of this element is higher than desired. This is accomplished by adding powered alkali materials, such as $K_2CO_3$, $Na_2CO_3$ or $NaHCO_3$ to the dust prior to heating. At the temperatures which are generated in the furnace, these materials combine with the sulfur present in the dust and produce volatile sulfate compounds, the latter being readily evolved from the high temperature melts.

An example of this sulfur removal process will now be provided. Using 50 pounds of the kiln dust waste material previously referred to in this specification, 1.8 pounds of powdered potassium carbonate ($K_2CO_3$) was mixed with the dust to result in a blended starting product having the following composition:

| Compound | % in Blended Starting Material |
|---|---|
| $SiO_2$ | 15.1 |
| $Al_2O_3$ | 4.2 |
| $Fe_2O_3$ | 2.4 |
| CaO | 47.4 |
| MgO | 0.96 |
| $SO_3$ | 5.2 |
| $Na_2O$ | 0.19 |
| $K_2O$ | 7.5 |
| L.O.I. | 17.0 |
| Misc. | 0.05 |
|  | 100.00% |

Upon heating in the electric arc furnace to about 3100° F., the sulfate content was reduced to a level significantly below that which was obtained without the addition of the alkali material.

The present invention then provides a number of important advantages. Primarily, the benefits result from creating two useful products from waste kiln dust. A second advantage is that the process is adaptable to different types of kiln dust waste, it being understood that the composition of the dust will vary depending on the concentration of materials in the kiln feed. One skilled in the art, after reading the present specification, will understand that lime or silica may be added to the dust if the composition so requires.

The method of the invention should not be limited by the foregoing specification, but is limited solely by the claims which follow.

We claim:

1. A method of recovering useful products from rotary cement kiln waste dust having an alkali content above that required for the production of cement clinker comprising the steps of:
    collecting said dust;
    introducing said dust to an electric arc furnace; and
    heating said dust in said furnace to a temperature sufficient to form a melt having desirable cement clinker properties and to volatilize alkali sulfates therefrom.

2. The method of claim 1 wherein said dust is heated in said furnace to a temperature of 3075° F. or above.

3. The method of claim 2 wherein said heating temperature is about 3200° F.

4. The method of claim 1 comprising the further step of recovering products volatilized from said furnace during said heating step.

5. A method of recovering useful products from a rotary cement kiln waste dust having sulfur and alkali contents above those required for the production of acceptable cement clinker comprising the steps of:
    collecting said dust;
    mixing with said dust a quantity of powdered alkali material sufficient to combine upon heating with the excess sulfur present in said dust to form volatile alkali sulfate compounds;
    introducing said dust and alkali material mixture into an electric arc furnace; and heating said mixture in said furnace to a temperature sufficient to form said volatile sulfate compounds and to form a melt having desirable cement clinker properties and to volatilize alkali sulfates therefrom.

6. The method of claim 1 wherein said mixture is heated in said furnace to a temperature of 3075° F. or above.

7. The method set forth in claim 6 wherein said heating temperature is about 3200° F.

8. The method set forth in claim 5 comprising the further step of collecting the products volatilized from said furnace during said heating step to recover a high potassium content material.

9. The method set forth in any of claims 5–8 wherein the powdered alkali material is selected from the group consisting of $K_2CO_3$, $Na_2CO_3$, $NaHCO_3$ or mixtures thereof.

* * * * *